(12) United States Patent
Staengler et al.

(10) Patent No.: US 9,552,476 B2
(45) Date of Patent: Jan. 24, 2017

(54) PREVENTION OF PIRATE PRODUCTS IN AN ELEVATOR CONTROL USING ID

(71) Applicant: KONE Corporation, Helsinki (FI)

(72) Inventors: Ferenc Staengler, Hyvinkää (FI); Jukka Korpela, Hyvinkää (FI); Timo Makkonen, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 423 days.

(21) Appl. No.: 14/192,625

(22) Filed: Feb. 27, 2014

(65) Prior Publication Data

US 2014/0284143 A1 Sep. 25, 2014

(30) Foreign Application Priority Data

Mar. 25, 2013 (EP) .................................... 13160872

(51) Int. Cl.
  *B66B 1/34* (2006.01)
  *G06F 21/44* (2013.01)

(52) U.S. Cl.
  CPC ................. *G06F 21/44* (2013.01); *B66B 1/34* (2013.01)

(58) Field of Classification Search
  CPC .................................... B66B 1/34; G06F 21/44
  USPC .................. 187/247, 391, 393, 396
  See application file for complete search history.

(56) References Cited

U.S. PATENT DOCUMENTS

| | | | |
|---|---|---|---|
| 5,579,509 A * | 11/1996 | Furtney | G06F 8/71 703/27 |
| 6,269,911 B1 * | 8/2001 | Richter | B66B 1/34 187/247 |
| 6,754,723 B2 * | 6/2004 | Kato | G06K 15/00 709/217 |
| 6,869,014 B2 * | 3/2005 | Gerstenkorn | G07C 9/00103 235/375 |
| 6,909,942 B2 * | 6/2005 | Andarawis | G06F 1/12 361/679.01 |

(Continued)

OTHER PUBLICATIONS

"Hardware Copy Protection", Nov. 16, 2012, XP055076111, Retrieved from the Internet: URL:http://web.archive.org/web/20121116142633/http://www.az-tech.com/everkey.html [retrieved on Aug. 22, 2013] p. 1.

(Continued)

*Primary Examiner* — Anthony Salata
(74) *Attorney, Agent, or Firm* — Birch, Stewart, Kolasch & Birch, LLP

(57) ABSTRACT

A system and a method to prevent the use of pirate products in an elevator control are provided. The system includes at least one elevator control, an updating mechanism and a connection between the elevator control and said updating mechanism. The elevator control includes essential electronic components provided with their own ID. An authorization section, which is configured to read the IDs of the essential electronic components, includes a reference list with allowed IDs, a comparator and a switching logic configured to issue an authorization signal for the elevator control to start or prevent operation of the elevator control depending on the comparison result of the comparator. The connection between the elevator control and the updating mechanism is configured to initiate the elevator control to update the IDs of the essential electronic components in the elevator control.

17 Claims, 1 Drawing Sheet

(56) References Cited

U.S. PATENT DOCUMENTS

| | | | | |
|---|---|---|---|---|
| 7,172,055 | B2* | 2/2007 | Engel | B66B 25/006 |
| | | | | 187/391 |
| 7,344,004 | B2* | 3/2008 | Engel | B66B 1/34 |
| | | | | 187/247 |
| 8,006,822 | B2* | 8/2011 | Tschuemperlin | G06F 9/4411 |
| | | | | 187/247 |
| 8,988,223 | B2* | 3/2015 | Puleston | H04L 67/04 |
| | | | | 340/10.1 |
| 2004/0193518 | A1* | 9/2004 | Deplazes | B66B 5/0025 |
| | | | | 705/34 |
| 2007/0168294 | A1* | 7/2007 | Tsurukawa | G06F 21/10 |
| | | | | 705/59 |
| 2007/0197261 | A1* | 8/2007 | Humbel | G06Q 30/00 |
| | | | | 455/558 |
| 2016/0048709 | A1* | 2/2016 | Butler | H04L 67/1097 |
| | | | | 340/10.51 |

OTHER PUBLICATIONS

"Kone decoder dongle", Aug. 22, 2013, XP055076141, Retrieved from the Internet: URL:http://www.aliexpress.com/item/Kone-kone-decoder-dongle-aluminum-alloy-shell-elevator-accessories/1162249638.html [retrieved on Aug. 22, 2013].

* cited by examiner

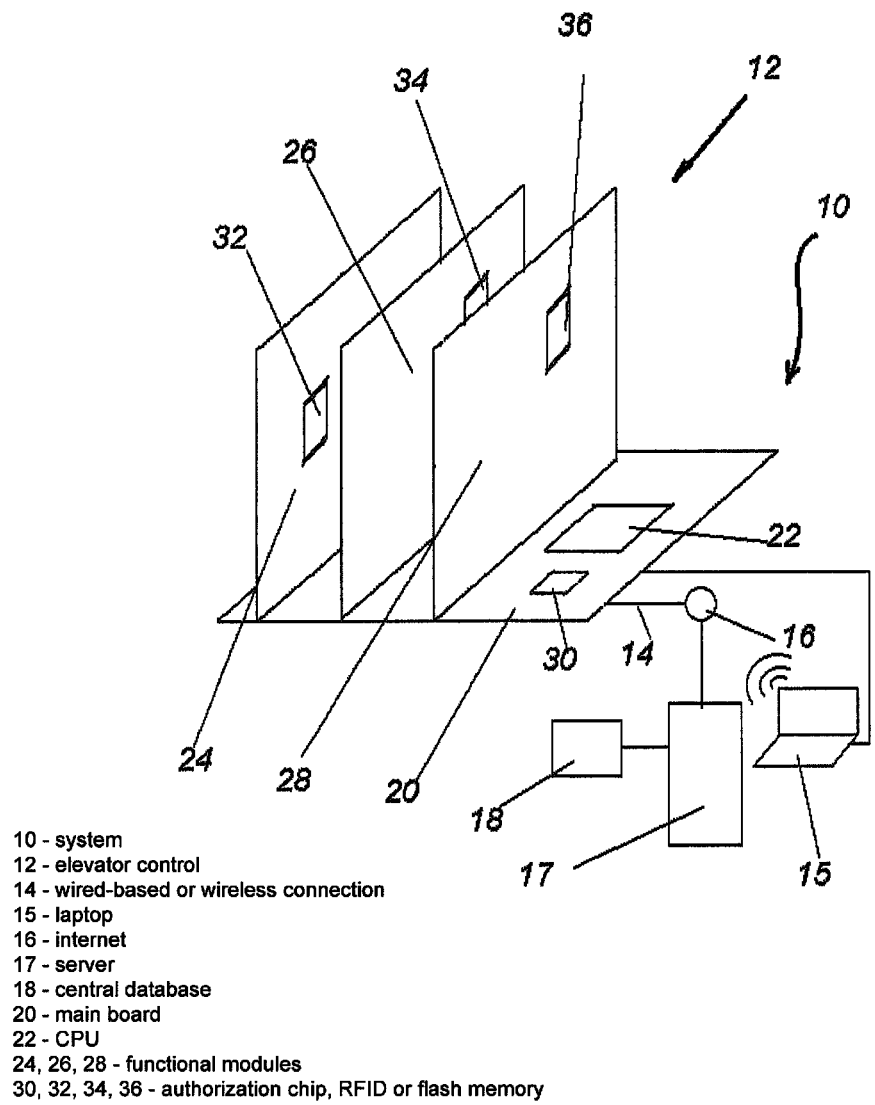
10 - system
12 - elevator control
14 - wired-based or wireless connection
15 - laptop
16 - internet
17 - server
18 - central database
20 - main board
22 - CPU
24, 26, 28 - functional modules
30, 32, 34, 36 - authorization chip, RFID or flash memory

PREVENTION OF PIRATE PRODUCTS IN AN ELEVATOR CONTROL USING ID

BACKGROUND OF THE INVENTION

1. Field of the Invention

The present invention refers to a system and method to prevent the use of pirate products in an elevator control.

2. Description of Background Art

Particularly, globally working elevator manufacturers face the problem that essential parts of an elevator control are replaced by pirate products which do not only affect the business turnover of the elevator company but the more involve the risk that components are introduced in the elevator control which are of only minor quality. Accordingly, by the use of pirate products, the reliability of the elevator control in total and accordingly safety of the elevator and the image of the elevator manufacturer could be essentially affected.

SUMMARY OF THE INVENTION

It is therefore object of the present invention to provide a system which prevents the use of pirate products in an elevator control.

This object is solved with a system and method according to the present invention. Preferred embodiments of the invention are subject-matter of the corresponding dependent claims.

The inventive content may also consist of several separate inventions, especially if the invention is considered in the light of expressions or implicit sub-tasks or in view of advantages or sets of advantages achieved. In this case, some of the attributes contained in the claims below may be superfluous in respect of separate inventive concepts.

The inventive system comprises at least one elevator control. Of course advantageously all elevator controls of the elevators sold by the elevator manufacturer may be included into said system. It is also possible to include only those elevator controls into the inventive pirate prevention system which are sold to countries where product piracy is wide spread.

The system further comprises an updating means which is or can be connected to the elevator control. Preferably, the updating means is a tool, e.g. the laptop of a service technician so that the connection between the elevator control and the updating means can be established by connecting the laptop of the service technician to the elevator control by any wire bound or wireless connection. It is of course also possible that the updating means is a so-called data cloud available via the internet from elevators from all around the world. The updating means can also be provided on a regional level or accessible via a telephone line.

The system further comprises a connection between the elevator control and said updating means. The connection might be a wire connection or wire-less connection in case the updating means is a service tool, like a laptop. The connection can also be any case of network connection if the updating means is provided in connection with a central database of the elevator company or any related service company. Of course a connection to a service tool as well as a network connection to a central database, e.g. via internet may be provided.

The elevator control comprises several essential electronic components. These essential electronic components of the elevator control are provided with their own ID (identification) means. Essential electronic components are components which add essential functionality to the elevator control. These essential elements are normally provided as modules. In modern elevator controls, these essential electronic components are often embodied as plug-in modules which can be plugged to the main board of the elevator control. These essential electronic components can be for example a call allocation unit, a motor controller, the safety chain control, the elevator car control, the elevator shaft control etc. These essential electronic components of the elevator control are tagged with their own ID number in any possible way known in the art. An easy way of providing the ID readable for the elevator control is to provide an authorization chip on the essential electronic components which comprises the ID of said component. Another option is to store the ID in a flash memory of a microcontroller of the essential elevator components. Also an RFID tag can be used for identifying the essential elevator component. In the present invention, it is essential that the ID of the essential electronic component can be read by the elevator control.

The elevator control further comprises an authorization section which elevator control further comprises an authorization section, which authorization section may be provided e.g. in the CPU of the elevator control or in a safety chip of the elevator control. The authorization section is configured to read the IDs from the corresponding ID means of the essential electronic components into the elevator control. The elevator control, preferably the authorization section, comprise(s) a reference list with allowed IDs of the essential electronic components. The authorization section further comprises a comparator for comparing the IDs of the essential electronic components with the reference list, and a switching logic configured to issue an authorization signal for the elevator control to start or prevent operation of the elevator control depending on the comparison result of the comparator. If the group of IDs read into the elevator control meets the required pairing or grouping of IDs stored in the reference list, an authorization signal is issued to the switching logic so that the elevator control can be taken into operation. If the comparison shows a mismatch of the identities of the essential elevator components, the switching logic is activated to terminate or to prevent operation of the elevator control. In this case, service technicians can be sent to the elevator system in question to check the reason for the mismatch of IDs.

Accordingly the authorization section of the elevator control is the core part of the inventive safety system where the reference data is stored, which reads in the IDs of the essential components and decides via a comparison whether the pairing or grouping of the IDs of the essential components is allowed.

With this measure, it becomes immediately apparent whether the ID of an essential electronic component of the elevator control is missing or whether an ID of an essential electronic component is notified as being not included into the pairing.

According to the inventive system the connection between the elevator control and said updating means is configured to initiate an update of an existing grouping or pairing of IDs of the essential electronic components of the elevator. On this behalf the updating means could e.g. issue a command for the elevator control to input IDs from new replacement parts of essential electronic components to the reference list and/or assign IDs to the ID means of the new replacement parts of the essential electronic components. The term replacement part hereby designates an exchange component which comprises essentially the functionality of the replaced essential electronic component. The connection with the updating means could initiate the elevator control, particularly the authorization section thereof, to input the ID of a new replacement part and to add this ID to the internal reference list of the authorization section or to issue the ID from the reference list to the ID means of the replacement part.

Although it is not the most preferred solution the updating means could also be used to input the new (of course encrypted) IDs to the reference list and/or to assign IDs to the ID means of replacement parts of the essential electronic components.

Accordingly, in a preferred embodiment the authorization section of the elevator control already obtains the reference list with the IDs of the paired essential electronic components in course of the manufacture and the connection to the updating means is only used to update the reference list. Either in this connection the elevator control is initiated to replace the ID of the replaced essential electronic component with that of the replacement part or the elevator control is initiated to issue a new ID to the ID means of the replacement part according to its reference list. The essential item is that a change of a replacement part needs the connection of the updating means to allow the start of operation of the elevator control.

Although it is not a favored embodiment, the updating means could also actively be involved in the assigning of IDs. Thus, the first time before the elevator is put into use or after the replacement of an essential electronic component the updating means could be connected to the elevator control to transmit the allowed ID grouping to the reference list in the authorization section. Alternatively or additionally the updating means can also be provided to issue a new ID to a replacement of an essential electronic component. Therefore, in this embodiment a connection with the updating means could also be necessary in case of the first start of the elevator when putting it into use or after replacement of an essential electronic component. Independent of the embodiment the invention prevents that an essential electronic component of the elevator control is a pirate product.

Furthermore, by the inventive check of the pairing or grouping of the IDs of the essential electronic components the functionality of the grouping or pairing can be ensured. Thus it can be checked that the essential electronic components of the elevator control are grouped together correctly so that the use of wrong essential electronic components in an elevator control system can be avoided or detected. Also this functional check improves the safety of the operation of the elevator controls included in the inventive system.

The invention does not only provide an effective tool against product piracy but also ensures that correct groups of essential elevator components are grouped together in an elevator control. Furthermore, if a central database is used as an updating means the product distribution flow can be monitored globally via the monitoring of the IDs of the essential electronic components, which provides better feedback for marketing purposes.

It shall be clarified that the ID of an essential electronic component of the elevator control is not only an ID which is given to a certain type of essential electronic component but it is really a singular ID which is dedicated only to said essential electronic component.

In a preferred embodiment it can also be provided to dedicate all essential components of an elevator installation the same ID. In this case a wrong component can easily be detected as being different from the IDs of all other essential electronic components.

The ID can be provided by different techniques in the essential electronic components. The ID could for example be comprised in an authorization chip located on the essential electronic component or in a microcontroller flash memory of the essential electronic component. The ID could also be provided in an RFID tag of the essential electronic component. Of course, further possibilities of tagging each essential electronic component with a singular ID known in the market can be applied.

Preferably, the ID can be tagged in the essential electronic component in an encrypted manner so that it is impossible for third persons to read out the ID of the essential electronic component. Anyway, as each electronic component has preferably its own singular ID, the knowledge of such ID would not be helpful for product pirates as the double use of an ID would immediately detected by the inventive system.

Preferably, the authorization section is provided in the main CPU of the elevator control. This ensures that the authorization procedure is inseparably connected with the main component of the elevator control. Accordingly, it is not possible to separate the authorization section from the elevator control.

Preferably, the authorization section of the elevator control comprises an encryption circuit for the data transfer with the updating means. Via this measure it can be ensured that the data transfer between the elevator control and the updating means cannot be read. This further ensures the safety of the authorization procedure against misuse.

Preferably, the authorization section is activated with each start of the elevator control and it is located in the auto-start routine of the operating program of the elevator control. Via this measure, it is ensured that before any operation of the elevator control first the authorization check on the grouping of all essential components of the elevator control is performed.

Of course, also the main board in the CPU of the elevator control preferably has its own identity number which is transferred in the handshake with the central database.

As it has already been mentioned above, the central database may be comprised in a laptop of a service technician. It is of course preferable that the elevator control has a connection to a network, particularly an internet connection. But also a simple telephone line would be sufficient to handle the data transfer between the central database and the elevator control.

Preferably, an essential electronic component is a functional module of the elevator control. Often when an elevator control is maintained or serviced upon the detection of a failure, complete functional modules of the elevator control are replaced. Accordingly, it might be beneficial to provide each module of the elevator control with its own ID. Preferably, these functional modules are plug-in modules which can easily be replaced on the main board of the elevator control.

The invention also refers to a method for preventing the use of pirate products in an elevator control. According to said method, the essential electronic components of the elevator control are provided with an ID, as it has been already mentioned above. The method comprises the succession of following steps:

a) before start of operation of the elevator control the IDs of the components are read by an authorization section of the elevator control and are compared to a reference list of allowed IDs stored in the authorization section, and b) an authorization signal to start or prevent operation of the elevator control is issued depending on the comparison result.

Preferably, the authorization procedure of the invention is performed in connection with the booting or starting up of the elevator control. With this measure, it can be ensured that the elevator control does not begin to operate before the correct and allowed grouping of the essential elevator components in the elevator control has been verified. On this behalf the IDs of the components are read by an authorization section of the elevator control and are compared to a reference list of allowed IDs stored in the authorization section. By this comparison, it is ensured that the IDs of the essential electronic components read by the authorization section really correspond to the required ones in the reference list. Any change to the ID grouping of the reference list would indicate an uncertified electronic component, e.g. a pirate product. On the other hand, it can be ensured that no essential elevator components are missing which would lead to the conclusion that essential elevator components without any ID tags are used and in the end it can be ensured that the group of IDs forwarded by the elevator control are functionally correct so that there is no mismatch in the arrangements of the essential components in the elevator control. In response to the result of said comparison, the operation of the elevator control is allowed to start or not.

For filling or updating the reference list an updating means is connected to the elevator control to initiate an update of an existing grouping or pairing of IDs. On this behalf the updating means could e.g. issue a command to the elevator control to input an ID from a new replacement part to the reference list and/or to assign an ID to the ID means of the replacement part of one of the essential electronic components.

Although it is not the most preferred solution the updating means could also be used to input the new IDs of replacement parts to the reference list and/or to assign IDs to the ID means of replacement parts of the essential electronic components. The updating means can be a maintenance tool and/or a central database as it has already been mentioned before.

It could be provided for marketing purposes that the IDs or group of IDs of an elevator installation are transmitted to the central data base, preferably to an internet server. This data can be used for global marketing purposes.

Anyway, the method according to the present invention ensures that no elevator system is able to begin its operation without passing the authorization check beforehand. By this way it can be ensured that no system can run with low quality pirate products which might lead to dangerous operating situations of the elevator.

Preferably, the inventive authorization method can be performed with each start of the elevator system. Via this measure, it can be ensured that no elevator components are replaced by cheap pirate components during the operation of the elevator or during maintenance or service.

Preferably, all data transfer between the elevator control and the central database is encrypted as to prevent any misuse of said data.

Preferably, safety chips in the system as e.g. the ID means and the CPU 22 have ID data encoded inside silicon, e.g. in an inner layer of silicon, such that the data is impossible to reach without damaging silicon chip. Also, it has preferably an encrypting section such that every data communicated to/from the chip is encrypted and therefore it cannot be obtained by polling the communication bus.

Also, elevator control unit acts as a master (comprising the authorization section) such that if incompatibility of IDs is noticed then normal operation of elevator is prevented.

It shall be clear for the skilled person that the above-mentioned embodiments can be combined with each other arbitrarily.

BRIEF DESCRIPTION OF THE DRAWINGS

The FIGURE is a schematic view of a system according to the present invention.

DETAILED DESCRIPTION OF THE PREFERRED EMBODIMEMTS

The invention is now described by means of an embodiment. This shows a system 10 to prevent the use of pirate products in an elevator control.

The inventive system 10 comprises an elevator control 12. The system further comprises a laptop 15 of a service technician as an updating means, which laptop is via wire or wire-less connected 14 to the elevator control 12. Also a central database 18 may be provided as an updating means which is connected to the elevator control 12 via an internet-connection 14, 16 in between. The connection comprises a wire-based or wireless connection 14 to the internet 16 to which a server 17 of the updating means is connected. The server 17 is connected to the central database 18 in which reference IDs or groups of reference IDs of essential electronic components of elevator controls are stored.

The elevator control 12 comprises a main board 20 on which a CPU 22 is located. On the main board 20, three functional modules 24, 26, 28 are plugged in. The first plug-in module 24 is the motor controller, the second functional plug-in module 26 is the car controller and the third functional plug-in module 28 is the elevator shaft controller. On each functional plug-in module 24, 26, 28 as well as on the main board 20, an authorization chip, RFID or flash memory 30, 32, 34 and 36 is provided which comprises an individual ID, respectively. These authorization chips/RFID/flash memory have been allocated to the functional modules during the manufacture thereof or in course of the distribution of said functional modules. The IDs are issued by the elevator manufacturer, whereby each issued ID is stored together with the characteristics of the allocated essential electronic component, i.e. the functional module in the central database 18 of the elevator company.

When the elevator system wherein the elevator control 12 is located is taken into use, the elevator control 12 boots its system. In the CPU 22, an authorization section is provided which reads the data of each authorization chip 30-36 and maybe also reads its own ID which is provided in a flash memory of the CPU 22. The authorization section comprise(s) a reference list with allowed IDs of the essential electronic components and comprises a comparator for comparing the IDs of the essential electronic components with the reference list. Further the authorization section comprises a switching logic configured to issue an authorization signal for the elevator control to start or prevent operation of the elevator control depending on the comparison result of the comparator.

This ID data of the reference list is forwarded to the authorization section in the CPU 22 of the elevator control during manufacture or first time before the startup of the elevator via a laptop 15 of a service technician or via the interne connection 14, 16 to the central database 18 and its server 17. Furthermore, the reference list is updated via the updating means 15, 18 each time a functional module 22, 24, 26, 28, 30 of the elevator control is replaced. In this case the updating means initiates the elevator control to update the reference list with the new replacement part ID or to assign a corresponding ID from the reference list to the ID means of the new replacement part. Accordingly, on one hand it can be ensured that the essential electronic components 24, 28, 26 in the elevator control are really distributed by the elevator manufacturer and not by unauthorized companies. Further, the server compares via the identity of the CPU and the main board 20 the distributed elevator system in its pairing with the functional modules 24, 26, 28. If the grouping of the IDs read by the CPU 22 corresponds to a correct technical pairing according to the reference list in the CPU 22, an authorization signal is fed back to the CPU 22 which allows the CPU 22 to boot the system.

The updating means 15, 18 may also be provided to assign to IDs to the new essential electronic components 24, 26, 28 in the elevator control 12, that replace old ones.

It shall be clear from the above description that the invention is not restricted to the use of plug-in modules as essential electronic components and that the essential electronic components can also have other functionalities as the above-mentioned motor controller, car controller and shaft controller. Furthermore, it shall be clarified that instead of authorization chips, also a flash memory in a microcontroller of said essential electronic components or an RFID tag may be used which is read by corresponding reader on the main board.

The invention may be varied within the scope of the appended patent claims.

The invention claimed is:

1. A system to prevent the use of pirate products in an elevator control, comprising at least one elevator control, an updating mechanism and a connection between the elevator control and said updating mechanism, the elevator control comprises essential electronic components provided with their own ID device, the elevator control further comprises an authorization section,
wherein the authorization section is configured to read IDs from the corresponding ID device of the essential electronic components into the elevator and comprises:
a reference list with allowed IDs of the essential electronic components;
a comparator for comparing the IDs of the essential electronic components with the reference list; and
a switching logic configured to issue an authorization signal for the elevator control to start or prevent operation of the elevator control depending on the comparison result of the comparator,
wherein the connection between the elevator control and said updating mechanism is configured to initiate the elevator control to update the IDs of the essential electronic components in the elevator control, and
wherein the ID device of the essential electronic components is an authorization chip having internal encryption for data transfer.

2. The system according to claim 1, wherein the updating mechanism is configured to issue a command for the elevator control to input IDs of replacement parts of essential electronic components to the reference list and/or to assign IDs to the ID device of replacement parts of the essential electronic components.

3. The system according to claim 1, wherein the updating mechanism is a portable maintenance tool, which is connectable to a central database.

4. The system according to claim 1, wherein the updating mechanism is a central database having a network connection to the elevator control.

5. The system according to claim 1, wherein the IDs stored in the ID device of the essential electrical components are identical for identical elevators.

6. The system according to claim 5, wherein the ID device is associated with the essential electronic components in connection with their manufacturing.

7. The system according to claim 1, wherein the authorization section is provided in the main CPU of the elevator control.

8. The system according to claim 1, wherein the auto-start routine of the operating program of the elevator control comprises the starting of the operation of the authorization section.

9. The system according to claim 1, wherein an essential electronic component is a functional module of the elevator control.

10. A method for preventing the use of pirate products in an elevator control, wherein the essential electronic components of the elevator control are provided with an ID device, comprising the succession of following steps:
a) before start of operation of the elevator control the IDs of the components are read by an authorization section of the elevator control and are compared to a reference list of allowed IDs stored in the authorization section; and
b) an authorization signal to start or prevent operation of the elevator control is issued depending on the comparison result,
wherein the ID device of the essential electronic components is an authorization chip having internal encryption for data transfer.

11. The method according to claim 10, wherein steps a) and b) are repeated with each start of the elevator control.

12. The method according to claim 10, wherein an updating mechanism is connected to the elevator control initiate an update of an existing grouping or pairing of IDs in the elevator control.

13. The method according to claim 12, wherein the updating mechanism initiates the elevator control to add the ID from a new replacement part of an essential electronic component to the reference list and/or to assign an ID from the reference list to the ID device of the new replacement part.

14. The method according to claim 10, wherein each data which is transferred to/from the ID device or the authorization device of the elevator control is encrypted.

15. The method according to claim 10, wherein steps a) to b) are performed with each booting of the elevator control program.

16. The system according to claim 2, wherein the updating device is a portable maintenance tool, which is connectable to a central database.

17. The system according to claim 2, wherein the updating device is a central database having a network connection to the elevator control.

* * * * *